United States Patent [19]

Priegnitz

[11] 3,723,561

[45] Mar. 27, 1973

[54] THE SELECTIVE SEPARATION OF BUTENE-1 FROM A $C_4$ HYDROCARBON MIXTURE EMPLOYING ZEOLITES X AND Y

[75] Inventor: James W. Priegnitz, Elgin, Ill.

[73] Assignee: Universal Oil Products Company, Des Plains, Ill.

[22] Filed: Dec. 1, 1971

[21] Appl. No.: 203,837

[52] U.S. Cl. ............260/677 AD, 260/677 A, 55/75, 208/310
[51] Int. Cl. .............................................C07c 11/12
[58] Field of Search ...........260/677 A, 677, 677 AD; 208/310; 55/75

[56] References Cited

UNITED STATES PATENTS

| | | | |
|---|---|---|---|
| 3,151,178 | 9/1964 | Etherington | 260/677 AD |
| 2,894,998 | 7/1959 | Hess et al. | 55/75 |
| 3,531,539 | 9/1970 | Tidwell | 260/677 |
| 2,971,993 | 2/1961 | Kimberlin, Jr. et al. | 260/677 AD |

Primary Examiner—Delbert E. Gantz
Assistant Examiner—J. Nelson
Attorney—James R. Hoatson, Jr. et al.

[57] ABSTRACT

A process for the separation of butene-1 from other $C_4$ mono-olefins. A feed stream containing butene-1 along with another $C_4$ mono-olefin is contacted with a crystalline aluminosilicate adsorbent selected from the X or Y zeolites containing barium or potassium cations at conditions to effect the selective adsorption of butene-1. The butene-1 adsorbed by the adsorbent is thereafter recovered as a purified product.

24 Claims, No Drawings

THE SELECTIVE SEPARATION OF BUTENE-1 FROM A C HYDROCARBON MIXTURE EMPLOYING ZEOLITES X AND Y

BACKGROUND OF THE INVENTION

1. Field of the Invention

The field of art to which this invention pertains is hydrocarbon separation. More specifically, the claimed invention relates to a process for the separation of butene-1 from a feed mixture containing other $C_4$ mono-olefins using a crystalline aluminosilicate.

2. Description of the prior Art

Crystalline aluminosilicates are known in the art to be useful for separating hydrocarbons. Particularly some of the Type X or Type Y zeolites have been disclosed which relate to the separation of olefins from paraffinic hydrocarbons and the separation of butene-1 from isobutylene (see U.S. Pat. No. 3,531,539, Class 260-677). The present invention relates to the separation of mono-olefin isomers and in particular the separation of butene-1 from the feed mixture which contains other $C_4$ mono-olefinic hydrocarbons.

In comparing the various $C_4$ mono-olefinic hydrocarbons, namely butene-1, trans and cis- butene-2 and isobutylene it is found that butene-1 has the lowest motor octane of the group. It is preferable to remove this component from olefinic mixtures which will end up as direct components to gasoline fuels. The use of this process allows the separation of butene-1 from the other $C_4$ mono-olefins and allows a higher octane olefinic component to be utilized. Additional advantages of this process reside in the special chemical uses in which the butene-1 material is desired in a relatively high purity state. Because of the fact that some chemical process butene-1 is the preferred feed stock as compared to the other mono-olefins, the process of this invention may be utilized to separate butene-1 from butene-2 and/or isobutylene. Additional advantages can be obtained by concentrating the non-selectively adsorbed component, namely, isobutylene or butene-2 so it can be recovered in a relatively purified state. Another advantage found in the process of this invention is the relative inactivity of the adsorbent with respect to dimerization of the feed stock components and isomerization of butene-1 to other olefins, namely trans- or cis- butene-2.

SUMMARY OF THE INVENTION

This invention is a process for the separation of butene-1 from a feed stock containing butene-2 or iso-butylene or both. Feed stock is passed over an adsorbent comprising a Type X or Type Y zeolite containing potassium or barium cations to selectively adsorb butene-1 from the feed stock.

DETAILED DESCRIPTION OF INVENTION

Adsorbents which can be used in the process of this invention are generally referred to as crystalline aluminosilicates or molecular sieves and can comprise both the natural and synthetic aluminosilicates. Particular crystalline aluminosilicates encompassed by the present invention include aluminosilicate cage structures in which the alumina and silica tetrahedra are intimately connected in an open three dimensional network. The tetrahedra are cross-linked by the sharing of oxygen atoms with spaces between the tetrahedra occupied by water molecules prior to partial or total dehydration of this zeolite. The dehydration of the zeolite results in crystals interlaced with cells having molecular dimensions. Thus, the crystalline aluminosilicates are often referred to as molecular sieves when the separation which they effect is dependent essentially upon distinction between molecule sizes. In the process of this invention, however, the term molecular sieves is not suitable since the separation of isomers is dependent on electro-chemical attraction of different isomer configurations rather than pure physical size differences in the isomer molecules.

In hydrated form, the crystalline aluminosilicates generally encompass those zeolites represented by the formula in equation 1 below:

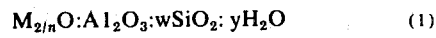

$$M_{2/n}O:Al_2O_3:wSiO_2: yH_2O \qquad (1)$$

where "M" is a cation which balances the electrovalence of the tetrahedra and is generally referred to as an exchangeable cationic site, "n" represents the valence of the cation, "w" represents the moles of $SiO_2$ and "y" represents the moles of water. The cations may be any one of a number of cations which will hereinafter be described in detail.

The Type X structured and Type Y structured zeolites as used in this specification shall include crystalline aluminosilicates having a three dimensional interconnected cage structure and can specifically be defined by U.S. Pat. Nos. 2,882,244 and 3,130,007. The terms "Type X structured" and "Type Y structured" zeolites shall include all zeolites which have a general structure as represented in the above two cited patents and specifically including those structures containing various cations exchanged upon the zeolite. In the most limiting sense, these terms refer to Type X and Type Y zeolites.

The Type X structure zeolites can be represented in terms of mole oxides as represented by the formula in equation 2 below:

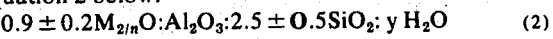

$$0.9 \pm 0.2 M_{2/n}O:Al_2O_3:2.5 \pm 0.5 SiO_2: y H_2O \qquad (2)$$

where "M" represents at least one cation having a valence of not more than 3, "n" represents the valence of "M" and "y" is a value up to about 9 depending upon the identity of "M" and the degree of hydration of the crystalline structure.

The Type Y structure zeolites can be represented in terms of the mole oxides for the sodium form as represented by the formula in equation 3 below:

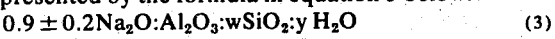

$$0.9 \pm 0.2 Na_2O:Al_2O_3:wSiO_2:y H_2O \qquad (3)$$

where "w" is a value of greater than about 3 up to 8, and "y" may be any value up to about 9.

Adsorbents contemplated herein include not only the sodium form of the Type Y zeolite but also crystalline materials obtained from such a zeolite by partial or complete replacement of the sodium cation with other individual cations or groups of cations. Similarly, the Type X zeolite also may be ion-exchanged.

Cationic or base exchange methods are generally known to those familiar with the field of crystalline aluminosilicate production. They are generally performed by contacting the zeolite with an aqueous solution of the soluble salts of the cation or cations desired to be placed upon the zeolite. The desired degree of exchange takes place before the sieves are removed from the aqueous solution, washed and dried to a desired water content. It is contemplated that cation exchange operations of the cation exchange may take place using individual solutions of desired cations placed on the zeolite or using an exchange solution containing a mixture of cations, where two or more desired to be placed on the zeolite.

In normal cation exchange operations, cations can be placed on the zeolite in any concentration ranging from about 1 percent to about 100 percent of the original cations present being replaced by the cation or cations desired to be exchanged upon the zeolite. By knowing the empirical formula including the silica to alumina ratio of the zeolite used, its water content and the type zeolite used, whether it be Type X or Type Y structured zeolite, and the percentage or binder of any within the zeolite, it is possible to calculate the percentage of ion exchange taking place. Obviously, the percentage of ion exchange which takes place can be represented in terms of the weight percent of the zeolite which contains a cation when the atomic weight of the cation and its valence are determined. Cations are placed singly or in pairs upon the zeolite and in some instances, the preferred cations may be present on the zeolite in high concentrations with various relatively small amounts of other cations present. It is preferred, however, to reduce the unpreferred cation content to a point where that cation does not function to substantially alter the selectivity of the adsorbent for the component desired to be adsorbed.

Cations which can be placed on the zeolite adsorbent include the Group IA, Group IIA, Group VIII and the group IB metals of the Periodic Table of The Elements. Other cations not mentioned may be present in small quantities. For the purposes of this invention, cations to be used on the adsorbent shall include cations selected from the above-mentioned groups and with the limitation that the cation utilized be selective towards butene-1 from the other feed stock components. Preferably from the group containing the above recited cations, potassium and barium are preferred and potassium alone being especially preferred, since these two cations selectively adsorb butene-1 from other feed stock components in a highly selective manner.

Feed stocks which can be utilized in the process of this invention can be derived from any of the refinery processes known to the art. Specifically, the feed stocks include $C_4$ mono-olefinic hydrocarbons such as butene-1, isobutylene, trans-butene-2 and cis-butene-2. The term "butene-2" shall include both the cis- and trans-isomer configuration of that hydrocarbon. Other materials can be present in the feed stock such as large quantities of paraffinic or naphthene substances and in some instances low concentrations of aromatic hydrocarbons and other contaminant substances such as the combined sulfur nitrogen compounds. It is preferred, however, to substantially reduce the quantity of components which would contribute to the deactivation of the adsorbent by blocking off the adsorptive site passageways to feed stock components.

In the separation art, the feed stock is generally broken down into two components — namely, an extract material and a raffinate material. The extract material is the component of the feed stock which is selectively adsorbed by the adsorbent and for purposes of this specification shall mean butene-1. Raffinate material shall include the components of the feed stock which are not selectively adsorbed by the adsorbent and should include for the purposes of this disclosure isobutylene and the butene-2 isomers. The raffinate may also include extraneous components mentioned above and the extract materials may also contain in some instances small contaminant materials such as olefins or aromatics or combined sulfur or nitrogen compounds. It is preferable when utilizing feed stocks to use feed stocks which contain anywhere from about a few percent of butene-1 and a few percent of total olefins up to feed stocks which contain essentially pure concentrations of $C_4$ olefins. Specific feed stocks which can be utilized in the process of this invention include a feed stock containing about 35 vol.% butene-1, 32.5 vol.% isobutylene and 32.5 isobutane. Other feed stock compositions include feed stocks containing approximately 21 vol.% butene-1, 21 vol.% isobutylene, 16% trans-butene-2, 16% cis-butene-2 with remaining feed stock components comprising a butane component such as iso-butane or normal butane. The feed stock can contain other paraffinic substances having higher molecular weight such as heptene or hexanes or octanes or nonanes or higher molecular weight paraffins. It is preferred to utilize feedstocks having more than about 15 vol.% total olefins.

Since it is desired to recover the extract stream in relatively purified form, it is desired that a desorption operation remove the selectively adsorbed extract component from the adsorbent for recovery purposes. Basically, the desorption operation includes either the passing of a gas or hydrocarbon material over the adsorbent in the absence of most raffinate material and the recovery of extract material by the replacement of the purging of the extract material from the adsorbent. Specifically, desorbent materials which can be included in the process of this invention include higher weight olefins such as octene-1 or lower molecular weight olefins, all of which are easily capable of separation from butene-1. Specifically, desorbents which contain mixtures of normal olefins and isoparaffins are found to possess desired qualities with respect to desorbing the extract material from the adsorbent.

In specific instances in which liquid operations take place, a preferred desorbent for the butene-1 separation includes a mixture of 20 vol.% octent-1 and 80 vol.% isooctane. Other desorbent materials can be used such as aromatic hydrocarbons or paraffinic substances. Still other desorbent materials which are easily separated from butene-1 include such readily available gases as hydrogen or methane or in some instances steam or air, all of which can be used to purge the extract material from the adsorbent.

Adsorption conditions include temperatures from ambient up to about 350° F. or higher. In some instances the 350° F. temperature may be too high as catalytic activity may be initiated at these temperatures, causing either dimerization or isomerization of butene-1 to another olefin which may not be desired. Pressures can be of any reasonable range anywhere from vacuum up to many thousands of pounds. The higher the pressures and temperatures utilized, the more expensive the process becomes to build and to operate. In all probabilities, lower pressure and temperature ranges are preferred.

It is preferred to operate the adsorption conditions of liquid phase operation although vapor phase may be utilized. The advantages with liquid phase operations are that generally lower temperatures can be utilized at a given pressure. Other benefits may be derived from the liquid phase operation in that the selectivity of the adsorbent does not have to overcome the vapor pressure differences in the feed components which might have an adverse effect on selectivity when operating in the vapor phase. Adsorption conditions also include the passing of the feed stock over an adsorbent material containing the selective cations. The adsorbent then selectively adsorbs butene-1 in the feed stock while leaving raffinate material such as butene-2 or iso-butylene in interstitial void spaces between the adsorbent particles. Included within the definition adsorption conditions can be a purge step in which the raffinate material is either purged from the adsorbent by another hydrocarbon material or removed by a gas purging step leaving an adsorbent containing essential butene-1 at the selective adsorptive sites within the adsorbent particles.

Desorption conditions include the pressure temperature limitations described above for the adsorption conditions. Additionally, desorption conditions include the passage of a desorbent material over the adsorbent after the adsorbent has contacted the feed stock.

Depending upon the processing scheme utilized, desorption conditions can include a gas purge at a higher temperature than adsorption conditions and in conjunction with a reduced pressure. Using these type operations, butene-1 can be easily recovered from the adsorbent. Other desorption conditions can include the passage of desorbent material as a liquid over the adsorbent at conditions to effect the removal of butene-1 from the adsorbent and replacement thereof on the adsorbent by the desorbent material. The butene-1 material is then recovered in admixture with the desorbent material and is passed into a simple fractionating or separating means in which pure butene-1 and desorbent are recovered. Desorption conditions can include the removal or desorbent material from the adsorbent by purging operations. In these instances, the material which is adsorbed upon the adsorbent can be removed by a gas purge or vacuum desorption step. The adsorbent can then be recontacted with feed stock at adsorption conditions.

The various flow schemes which can be utilized to effect the process of this invention include the relatively simple swing-bed operations in which one or more adsorbent beds are connected in a manner to allow adsorption and desorption operations to take place in each of the beds simultaneously with the switching of feed stock and desorbent materials between the individual adsorbent beds to effect the relatively continuous production of extract and raffinate materials. The process of this invention can also be effected using a single chamber in which alternate streams are passed through it; however, this process does not render continuous production of extract material.

Especially preferred flow schemes are those generally referred to in the separation art as fixed bed countercurrent flow processes in which a fixed bed and a rotary valve are operated to effect a simulated moving bed operation. The general concept of this flow scheme is disclosed in U. S. Pat. No. 2,985,589 having as its inventor Donald B. Broughton and issued to Universal Oil Products Company.

In some instances, regeneration of the adsorbent may be necessary in order to allow a continuous production of high quality extract material. Regeneration may be required when high quantities of aromatics or contaminant material such as sulfur or nitrogen compounds are present on the adsorbent in a concentration large enough to alter the selectivity below an optimum predetermined level. Specifically, regeneration can include the burning off of contaminant residues on the adsorbent or the contacting of the adsorbent with steam or water or hydrocarbons at conditions to effectively flush off the contaminant materials from the adsorbent material. The adsorbent material can then be purged of regenerant and then reused. In some instances, regeneration may not totally effectively regenerate the adsorbent but may be beneficial however.

EXAMPLE I

In this example, tests were conducted on various crystalline aluminosilicate adsorbents to determine the ability to separate butene-1, butene-2 and isobutylene. The adsorbents utilized consisted essentially of Type X crystalline aluminosilicates which had been ion-exchanged with various cations prior to testing. All of the adsorbents utilized were from 20 to 40 mesh in particle size.

The equipment utilized in this experiment consists of an adsorbent vessel which contained the particular adsorbent being tested. The chamber had inlet and outlet streams and was located within a heat control means in order that the streams passing into and out of the chamber along with the adsorbent present chamber could be maintained at a constant temperature of about 50° C. Sufficient pressure was maintained upon the system to maintain the feed and effluent in a liquid phase.

The procedure utilized for testing the adsorbent consisted of passing desorbent material through the adsorbent chamber at a liquid hourly space velocity of about 1 to 1.2. Periodically, a feed sample was injected into the desorbent stream passing into the adsorbent stream and allowed to pass through the chamber. The effluent from the adsorbent chamber was then passed into a gas chromatographic column which was able to determine and plot the relative concentrations of the feed stock components in the effluent stream as a function of time. After a feed pulse was passed through the adsorbent chamber, the adsorbent was allowed to contact the adsorbent in the chamber to flush off any remaining feed which had been adsorbed upon a sieve within the chamber. By utilizing my experience with chromatographic methods of separation, it was possible to determine from the chromatograph generated the relative selectivity and adsorptive capacity of an adsorbent with respect to butene-1 and the other $C_4$ mono-olefins.

The feed stocks utilized throughout this experiment consisted of a mixture of 21.43 vol.% butene-1, 21.43 vol.% isobutylene, 16.19 vol.% trans-butene-2, 16.19 vol.% cis-butene-2 and 24.76 vol.% of isobutane which is used as a carrier and tracer agent.

The selectivity of an adsorbent tested is necessary to be defined in order to determine the relative ability of an adsorbent to concentrate various feed stock components. The selectivity of an adsorbent is defined as the ratio of concentrations of two components adsorbed on an adsorbent over the ratio of the same two components in an unadsorbed phase surrounding the adsorbent particles. Specifically, the selectivity is defined as shown in equation 4 below $$\text{Selectivity} = B_{x/y}(x/y)a/(x/y)b \qquad (4)$$

where the ratio of the two components X and Y determine the selectivity. Subscript "$a$" refers to the adsorbed composition while subscript "$b$" refers to the composition of the material which was surrounding the adsorbent particles present in the interstitial void spaces of the adsorbent.

As can be seen from the above equation where the ratio of selectivity is greater than unity for two components, component X would be the selectively adsorbed component from the feed stock consisting of components X and Y. Where the selectivity would be less than unity, the selectivity would be reversed and component Y as shown in the equation would be the more selective component of the feed stock. As can be seen from the specific definition of selectivity used, it is a relative term and can only be applied in relation to two components in a feed stock.

The adsorbents utilized in this experiment were essentially Type X structured crystalline aluminosilicates which contain approximately 20 wt. percent of a binder material comprising aluminosilicate material. The binder was utilized to hold the crystalline aluminosilicate together and for all practical purposes did not affect the selectivity of the adsorbent.

The first adsorbent tested was essentially totally potassium-exchanged adsorbent. This adsorbent had a chemical analysis of approximately 44.7 wt.% $SiO_2$, 33.6 wt.% $Al_2O_3$, 3.8 wt.% $Na_2O$ and 17.8 wt.% $K_2O$. The above analysis was determined after the adsorbent had been subjected to calcination at 500° for sufficient time to allow a constant weight of the adsorbent to be recorded. It is assumed that the above chemical analysis is on an adsorbent as essentially free of volatile material which would exclude water from the analysis. The adsorbent as tested was treated to contain approximately 2 wt.% of water after it had been manufactured. The manufacturing procedure which was utilized to produce this sieve was essentially an ion-exchange with a water soluble potassium salt on an originally sodium Type X zeolite. The selectivities determined for butene-1 with respect to the other feed components of the feed stock utilized were as follows: butene-1 with respect to isobutylene selectivity amounted to about 2.2; butene-1 with respect to cis-butene-2 selectivity was about 2.5; and, butene-1 with respect to trans-butene-2 selectivity was also approximately 2.5. As can be seen from these results, the adsorbent was selective towards butene-1 with respect to all of the feed components tested and is preferable adsorbent for use in the claimed process.

EXAMPLE II

In this example a second adsorbent was utilized to test the effects of a barium and potassium exchanged Type X zeolite. The feed stock, apparatus and procedures utilized in this example were identical to those utilized in Example I above. The adsorbent utilized in this example was the adsorbent used in Example I which had been additionally treated with an aqueous barium solution. The X-ray analysis of this adsorbent indicated that it contained approximately 11.3 wt.% barium oxide and 13.5 wt.% potassium oxide. This adsorbent was tested as the adsorbent for Example I was tested and yielded results which indicate that it too was selective for butene-1 with respect to isobutylene and butene-2. Results of testing procedures indicates that the selectivity for butene-1 with respect to isobutylene was approximately 2.1 while the selectivity of butene-1 with respect to both the butenes-2 was approximately 2.4. The selectivity for butene-1 with respect to cis- or trans-butene-2 was not determined for reasons not pertinent to the presentation of this material.

As can be seen from the above examples, the potassium exchanged and barium and potassium exchanged Type X zeolites were selective towards butene-1 with respect to isobutylene and the trans- and cis-butene-2.

EXAMPLE III

In this example a stability test was run utilizing the adsorbent tested in Example I. The adsorbent activity testing was performed utilizing 4 and 18-hour recycle time periods utilizing a fresh feed which continuously was passed over the adsorbent at a temperature of about 15° C. and pressure sufficient to maintain liquid operations. The feed stream utilized for the stability testing consisted of approximately 70 vol.% of heptane, 20 vol.% of heptene and 10 vol.% of a feed mixture which composition is described for the feed mixture utilized in Examples I and II above.

The stability test was run to determine if dimers form from the $C_4$ olefins and to determine if the butene-1 could be isomerized. Both the 4-hour recycle and 18-hour recycle stability test indicated very slight production of heavier weight components—less than about 0.1 and 0.5 wt.% respectively for the 4 and 18-hour recycle period. Essentially all of the feed components present before recycle operations had started were present after completion of the testing which indicated that the potassium X sieve as utilized in Example I is essentially inert towards the feed stock components utilized.

The above examples are utilized as preferred and specific embodiments of the process of this invention are not to be utilized to unduly limit the claims nor the scope of disclosure presented herein.

I claim as my invention:

1. A process for the separation of butene-1 from a feed mixture containing at least one other mono-olefin containing 4 carbon atoms per molecule, which process comprises the steps of:
   i. contacting said feed mixture with a crystalline aluminosilicate adsorbent, selected from the group consisting of X and Y zeolites containing a cation selected from the group consisting of potassium and barium at cationic sites within said zeolite, at adsorption conditions to effect the selective adsorption of butene-1 by said adsorbent; and
   ii. recovering said butene-1 from said adsorbent.

2. Claim 1 further characterized in that said feed contains mono-olefins selected from the group consisting of cis-butene-2, trans-butene-2, and isobutylene.

3. Claim 1 further characterized in that said adsorption conditions include a temperature within the range of from about ambient to about 300° F.

4. Claim 1 further characterized in that said adsorption conditions include the liquid phase.

5. Claim 1 further characterized in that said crystalline aluminosilicate is an X zeolite.

6. Claim 1 further characterized in that said crystalline aluminosilicate is a Y zeolite.

7. A process for separating butene-1 from a feed mixture containing isobutylene, which process comprises the steps of:
   i. contacting said feed mixture with a crystalline aluminosilicate adsorbent, selected from the group consisting of X and Y zeolites containing cations selected from the group consisting of potassium and barium at cationic sites within said zeolite, at adsorption conditions to effect the selective adsorption of butene-1 by said adsorbent; and
   ii. recovering said butene-1 from said adsorbent.

8. Claim 7 further characterized in that said crystalline aluminosilicate is an X zeolite.

9. Claim 7 further characterized in that said crystalline aluminosilicate is a Y zeolite.

10. Claim 7 further characterized in that said adsorption conditions include a temperature within the range of from about ambient to about 300° F.

11. Claim 7 further characterized in that said cation is barium.

12. Claim 7 further characterized in that said cation is potassium.

13. Claim 7 further characterized in that said crystalline aluminosilicate is a Y zeolite containing barium.

14. Claim 7 further characterized in that said crystalline aluminosilicate is a Y zeolite containing potassium.

15. Claim 7 further characterized in that said crystalline aluminosilicate is an X zeolite containing barium.

16. Claim 7 further characterized in that said crystalline aluminosilicate is an X zeolite containing potassium.

17. A process for separating butene-1 from a feed mixture containing butene-2 which process comprises the steps of:
   i. contacting said feed mixture with a crystalline aluminosilicate adsorbent, selected from the group consisting of X and Y zeolites containing cations selected from the group consisting of potassium and barium at cationic sites within said zeolite, at adsorption conditions to effect the selective adsorption of butene-1 by said adsorbent; and
   ii. recovering said butene-1 from said adsorbent.

18. Claim 17 further characterized in that said crystalline aluminosilicate is an X zeolite.

19. Claim 18 further characterized in that said cations are barium.

20. Claim 18 further characterized in that said cations are potassium.

21. Claim 17 further characterized in that said crystalline aluminosilicate is a Y zeolite.

22. Claim 21 further characterized in that said cations are barium.

23. Claim 21 further characterized in that said cations are potassium.

24. Claim 17 further characterized in that said adsorption conditions include a temperature within the range of from about ambient to about 300° F.

* * * * *